(12) United States Patent
Kimura

(10) Patent No.: US 7,522,320 B1
(45) Date of Patent: Apr. 21, 2009

(54) DOCUMENT CHARACTER BOX DROPOUT

(75) Inventor: Hiroshi Kimura, Chigasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/246,949

(22) Filed: Oct. 7, 2008

(51) Int. Cl.
  H04N 1/04 (2006.01)
  H04N 1/32 (2006.01)
  H04N 1/46 (2006.01)
  H04N 1/44 (2006.01)

(52) U.S. Cl. ........................ 358/474; 358/468; 358/498; 358/501; 380/246

(58) Field of Classification Search ................. 358/474, 358/501, 506, 468, 496, 498; 382/317, 321, 382/312; 380/243, 244, 245, 246
See application file for complete search history.

(56) References Cited

U.S. PATENT DOCUMENTS

| 5,873,604 | A * | 2/1999 | Phillips | 283/70 |
| 2005/0156048 | A1* | 7/2005 | Reed et al. | 235/491 |
| 2006/0289645 | A1* | 12/2006 | Schuessler | 235/451 |
| 2008/0121728 | A1* | 5/2008 | Rodriguez | 235/494 |

FOREIGN PATENT DOCUMENTS

JP   2006240037 A1   9/2006

* cited by examiner

*Primary Examiner*—Houshang Safaipour
(74) *Attorney, Agent, or Firm*—The Law Firm of Andrea Hence Evans, LLC

(57) ABSTRACT

The present invention relates to a method of document character box dropout. A character box within the document is printed in thermosensitive ink which is rendered transparent upon the document's heating by a heating element or device. The heating process may be triggered once the scanning unit has detected the document. Following the heating process, pertinent information within the character box is then scanned without the character box.

1 Claim, 2 Drawing Sheets

DOCUMENT CHARACTER BOX DROPOUT

CROSS REFERENCE TO RELATED APPLICATIONS

There are no cross-references related to this application.

FIELD OF THE INVENTION

The present invention relates generally to image OCR scanner and form printing technology, and more particularly, but not exclusively, to a method of document character box dropout.

BACKGROUND OF THE INVENTION

In general, customers are directed on documents, forms or passbooks to write down pertinent information within character boxes. These character boxes help customers enter their information on the form, sheet or passbook in a character space outlined by the character box. The character box may be printed in a number of colors depending on the document or form being used. The pertinent information provided by a customer is then scanned to capture or record the pertinent information they provided while using different color-specific dropout methods to prevent the scan of the character boxes.

SUMMARY OF THE INVENTION

An aspect of an embodiment of the invention provides a method of document character box dropout. A document with a character box is fed into a scanning unit or device with the character box having been printed with thermosensitive ink. As the document is fed through the scanning device, it is detected by sensors, by way of the sensors detecting one or more start tags on the document, within the scanning unit or device. The presence of the document as detected by the sensors, determines when to begin heating the document. Once the document has been detected, the heating process is initiated. The document is then heated to render the character box transparent using a heating roller or element. The document is then scanned to capture or record the pertinent information written within the character space outlined by the character box after the character box has been rendered transparent during the heating process. As a result, the resultant scan captures only the pertinent information without the character box.

BRIEF DESCRIPTION OF THE DRAWINGS

The features and advantages of aspects of the present invention will become more apparent from the detailed description set forth below when taken in conjunction with the claims and drawings, in which like reference numbers indicate identical or functionally similar elements or steps. Additionally, the left-most digit of a reference number identifies the drawing in which the reference number first appears.

DETAILED DESCRIPTION OF THE INVENTION

Figure 1A:
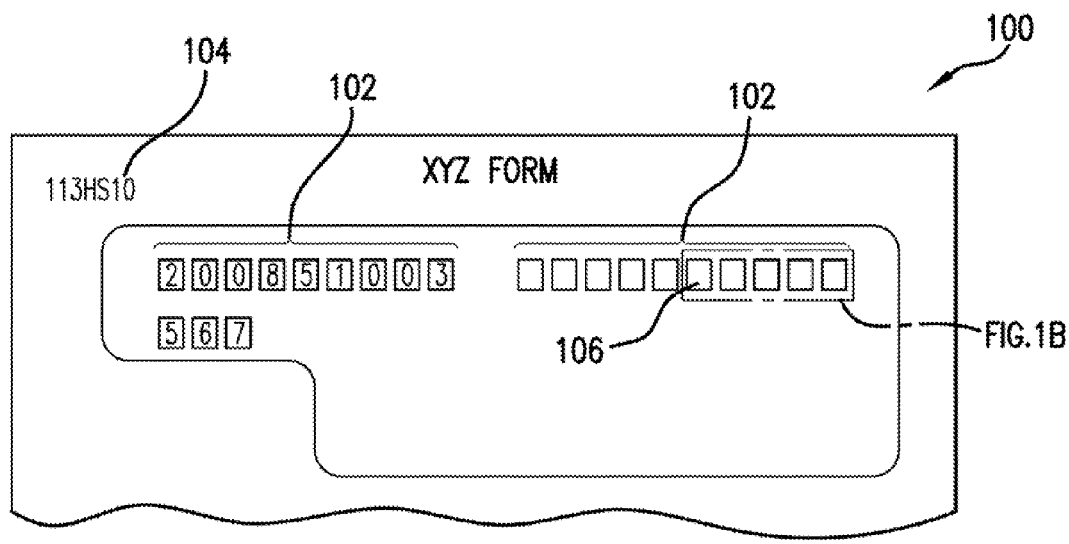
FIG. 1A illustrates a document or form having character boxes according to an embodiment of the present invention.
Figure 1B:
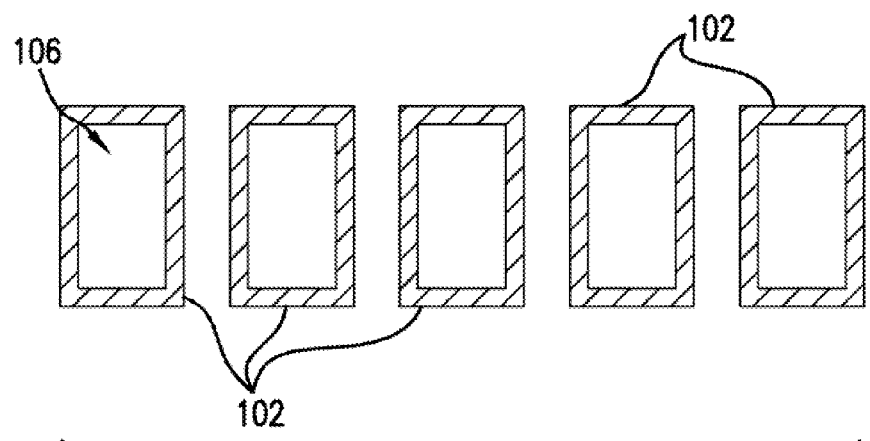
FIG. 1B illustrates a blowout of a document or form having character boxes according to an embodiment of the present invention.

Referring now to FIG. 1, a document or form 100 having character boxes 102 is shown. Form or document 100 is shown with character boxes 102 for customers to enter pertinent information such as their name, address, account number etc. into character space 106. In one aspect of an embodiment of the present invention, a document start tag in the form of a bar code or identification tag 104 may be used for a variety of purposes including identification, signaling the start of certain processes etc. In another aspect of an embodiment of the present invention, start tag 104 is used to signal the heating roller or element to initiate the heating process. Character space 106, in a blow out shown in FIG. 1B is outlined by character boxes 102 printed in thermosensitive ink.

Figure 2:
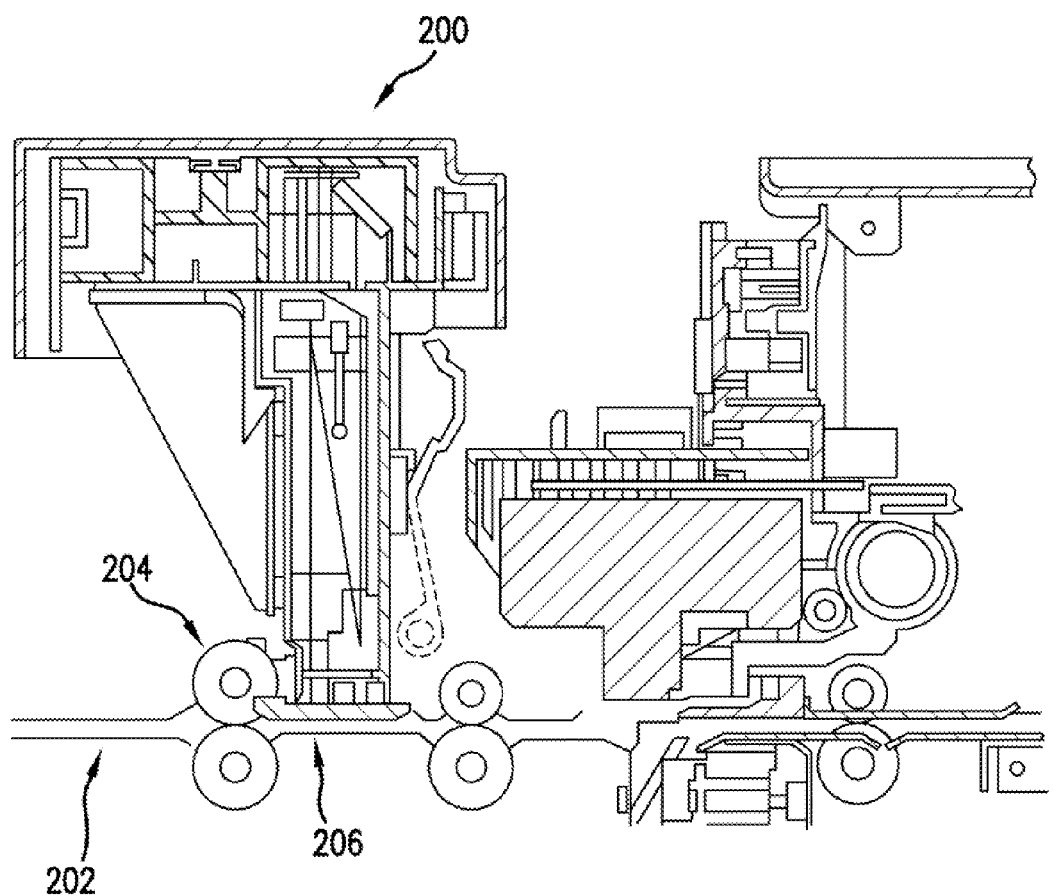
FIG. 2 illustrates a scanning unit according to an embodiment of the present invention.

Referring now to FIG. 2, a scanning unit 200 according to an embodiment of the present invention is shown. Scanning unit 200 is shown with a document or form feed 202 through which document or form 100 is fed. Document or form 100 would have its character box or boxes 102 printed in thermosensitive ink which will later be rendered transparent by a heating element. Document or form 100, once fed through form feed 202 is then directed through scanning unit 200 to heating roller 204. Heating roller 204 according to one aspect of an embodiment of the present invention begins heating document or form 100 once it is fed into form feed 202. In another aspect of an embodiment of the present invention, heating roller 204 begins heating the document or form once document identification or start tag 104 is sensed by the scanning unit media sensors (not shown) located before healing roller 204. Start tag 104 could be in the form of a bar code, number (as shown) or other identification tap on a part of the document. In another aspect of an embodiment of the present invention, the document, form or roll of paper may be detected when the start tag, in the form of a bar code or identification tag is detected by sensors at the point of scanning. This sends a signal to the heating roller or element to begin the heating process.

In another aspect of an embodiment according to the present invention, stop tags or markers may be used to signal the stop of the heating process. In yet another aspect of an embodiment of the present invention, heating of document or form 100 is stopped once the stop tags are detected by the scanning unit media sensors. These stop tags, similar in nature with the start tags, may be located at different locations of the document or form depending on the location of the character boxes on the particular document or form. For instance, if character boxes that need to be dropped out from a particular form are located towards the middle of the document, a stop tag will be located after the last character box location. Once these stop tags have been detected, the heating roller or element stops heating the document or form.

After document or form 100 has been detected by the scanning unit media sensors, heating roller 204 heats the document to render the thermosensitive ink used to print character box 102 transparent. Upon heating, character boxes 102 become transparent and scanning of document or form 100 takes place once document or form 100 reaches scanning point 206. Document or form 100 is then scanned and all pertinent information within character space 106, as written or entered by the customer, is then captured and stored while excluding character boxes 102.

The invention has been described in detail with particular reference to certain preferred embodiments thereof, but it will be understood that variations and modifications can be effected within the spirit and scope of the invention.

The invention claimed is:

1. A method of document character box dropout comprising:

feeding a document with a character box into a scanning device, wherein said character box is printed with thermosensitive ink, detecting said document by detecting start tags located on said document to determine when to begin heating said document;

initiating a heating process after said document has been detected;

heating said document, using a heating roller, to render said character box transparent; and scanning said document to capture pertinent information written within said character box after said character box has been rendered transparent by the heating process.

* * * * *